United States Patent
Rhoads et al.

(10) Patent No.: US 7,400,743 B2
(45) Date of Patent: *Jul. 15, 2008

(54) METHODS TO EVALUATE IMAGES, VIDEO AND DOCUMENTS

(75) Inventors: Geoffrey B. Rhoads, West Linn, OR (US); Ammon E. Gustafson, Holly Springs, NC (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/621,877

(22) Filed: Jan. 10, 2007

(65) Prior Publication Data

US 2007/0172097 A1  Jul. 26, 2007

Related U.S. Application Data

(63) Continuation of application No. 10/723,731, filed on Nov. 26, 2003, now Pat. No. 7,171,020, which is a continuation of application No. 10/012,703, filed on Dec. 7, 2001, now Pat. No. 6,744,906, which is a continuation of application No. 09/433,104, filed on Nov. 3, 1999, now Pat. No. 6,636,615, which is a continuation-in-part of application No. 09/234,780, filed on Jan. 20, 1999, now abandoned.

(60) Provisional application No. 60/071,983, filed on Jan. 20, 1998.

(51) Int. Cl.
*H04K 1/00* (2006.01)

(52) U.S. Cl. ..................................... 382/100
(58) Field of Classification Search .............. 382/100, 382/162, 232; 713/176; 358/3.28; 380/287, 380/54

See application file for complete search history.

(56) References Cited

U.S. PATENT DOCUMENTS

| 4,238,849 A | 12/1980 | Gassmann | 370/11 |
| 4,689,477 A | 8/1987 | Goldman | 235/480 |
| 4,723,072 A | 2/1988 | Naruse | 235/454 |

(Continued)

FOREIGN PATENT DOCUMENTS

DE  29 43 436 A1  5/1981

(Continued)

OTHER PUBLICATIONS

Fridrich, "A Hybrid Watermark for Tamper Detection in Digital Images," Proc. 5th Int. Symp. on Signal Processing and its Applications, Aug. 1999, pp. 301-304.*

(Continued)

*Primary Examiner*—Andrew W Johns

(57) ABSTRACT

The present invention relates generally to steganographic encoding and/or digital watermarking. In one embodiment, a method is provided including: obtaining an image or video; encoding a first steganographic component in the image or video, wherein the first steganographic component comprises a first set of properties that are designed to be affected in a first manner when transformed from a first color gamut to a second color gamut; and encoding a second steganographic component in the image or video, wherein the first steganographic component comprises a second set of properties that are designed to be affect in a second manner when transformed from the first color gamut to the second color gamut. Other implementations and embodiments are provided and claimed as well.

22 Claims, 4 Drawing Sheets

U.S. PATENT DOCUMENTS

| | | | |
|---|---|---|---|
| 5,228,056 A | 7/1993 | Schilling | 375/1 |
| 5,237,164 A | 8/1993 | Takada | 235/487 |
| 5,284,364 A | 2/1994 | Jain | 283/87 |
| 5,337,361 A | 8/1994 | Wang et al. | 380/51 |
| 5,354,097 A | 10/1994 | Tel | 283/72 |
| 5,384,846 A | 1/1995 | Berson et al. | 380/23 |
| 5,436,970 A | 7/1995 | Ray et al. | 380/23 |
| 5,450,490 A | 9/1995 | Jensen et al. | 380/6 |
| 5,471,533 A | 11/1995 | Wang et al. | 380/51 |
| 5,490,217 A | 2/1996 | Wang et al. | 380/51 |
| 5,510,900 A | 4/1996 | Shirochi et al. | 358/335 |
| 5,646,997 A | 7/1997 | Barton | 380/23 |
| 5,652,626 A | 7/1997 | Kawakami et al. | 348/463 |
| 5,659,726 A | 8/1997 | Sandford, II et al. | 395/612 |
| 5,664,018 A | 9/1997 | Leighton | 380/54 |
| 5,694,471 A | 12/1997 | Chen et al. | 380/25 |
| 5,748,763 A | 5/1998 | Rhoads | 382/115 |
| 5,751,854 A | 5/1998 | Saitoh et al. | 382/218 |
| 5,799,092 A | 8/1998 | Kristol et al. | 380/51 |
| 5,822,436 A | 10/1998 | Rhoads | 382/54 |
| 5,841,886 A | 11/1998 | Rhoads | 382/115 |
| 5,857,038 A | 1/1999 | Owada et al. | 382/284 |
| 5,864,622 A | 1/1999 | Marcus | 380/23 |
| 5,892,900 A | 4/1999 | Ginter et al. | 395/186 |
| 5,905,800 A | 5/1999 | Moskowitz et al. | 380/28 |
| 5,907,149 A | 5/1999 | Marckini | 235/487 |
| 5,912,974 A | 6/1999 | Holloway et al. | 380/51 |
| 5,943,422 A | 8/1999 | Van Wie et al. | 380/9 |
| 5,951,055 A | 9/1999 | Mowry, Jr. | 283/93 |
| 6,024,287 A | 2/2000 | Takai et al. | 235/494 |
| 6,026,193 A | 2/2000 | Rhoads | 382/232 |
| 6,065,119 A | 5/2000 | Sandford, II et al. | 713/200 |
| 6,104,812 A | 8/2000 | Koltai et al. | 380/51 |
| 6,185,683 B1 | 2/2001 | Ginter et al. | 713/176 |
| 6,226,387 B1 | 5/2001 | Tewfik et al. | 382/100 |
| 6,233,347 B1 | 5/2001 | Chen et al. | 382/100 |
| 6,233,684 B1 | 5/2001 | Stefik et al. | 713/176 |
| 6,237,786 B1 | 5/2001 | Ginter et al. | 213/153 |
| 6,240,121 B1 | 5/2001 | Senoh | 375/130 |
| 6,243,480 B1 | 6/2001 | Zhao et al. | 382/100 |
| 6,246,775 B1 | 6/2001 | Nakamura et al. | 382/100 |
| 6,246,777 B1 | 6/2001 | Agarwal et al. | 382/100 |
| 6,272,176 B1 | 8/2001 | Srinivasan | 375/240 |
| 6,272,634 B1 | 8/2001 | Tewfik et al. | 713/176 |
| 6,275,599 B1 | 8/2001 | Adler et al. | 382/100 |
| 6,278,792 B1 | 8/2001 | Cox et al. | 382/100 |
| 6,285,775 B1 | 9/2001 | Wu et al. | 382/100 |
| 6,285,776 B1 | 9/2001 | Rhoads | 382/100 |
| 6,289,108 B1 | 9/2001 | Rhoads | 382/100 |
| 6,292,092 B1 | 9/2001 | Chow et al. | 340/5.6 |
| 6,314,192 B1 | 11/2001 | Chen et al. | 382/100 |
| 6,314,457 B1 | 11/2001 | Schena et al. | 709/219 |
| 6,332,031 B1 | 12/2001 | Rhoads et al. | 382/100 |
| 6,332,194 B1 | 12/2001 | Bloom et al. | 713/176 |
| 6,334,187 B1 | 12/2001 | Kadono | 713/176 |
| 6,343,138 B1 | 1/2002 | Rhoads | 382/100 |
| 6,374,036 B1 | 4/2002 | Ryan et al. | 386/94 |
| 6,385,329 B1 | 5/2002 | Sharma et al. | 382/100 |
| 6,389,151 B1 | 5/2002 | Carr et al. | 382/100 |
| 6,398,245 B1 | 6/2002 | Gruse et al. | 280/228 |
| 6,418,232 B1 | 7/2002 | Nakano et al. | 382/100 |
| 6,425,081 B1 | 7/2002 | Iwamura | 713/176 |
| 6,427,012 B1 | 7/2002 | Petrovic | 380/238 |
| 6,427,020 B1 | 7/2002 | Rhoads | 382/100 |
| 6,427,140 B1 | 7/2002 | Ginter et al. | 705/80 |
| 6,439,465 B1 | 8/2002 | Bloomberg | 235/494 |
| 6,456,726 B1 | 9/2002 | Yu et al. | 382/100 |
| 6,487,301 B1 | 11/2002 | Zhao | 382/100 |
| 6,512,837 B1 | 1/2003 | Ahmed | 382/100 |
| 6,542,618 B1 | 4/2003 | Rhoads | 382/100 |
| 6,574,350 B1 | 6/2003 | Rhoads et al. | 382/100 |
| 6,577,746 B1 | 6/2003 | Evans et al. | 348/473 |
| 6,580,819 B1 | 6/2003 | Rhoads | 382/135 |
| 6,591,009 B1 * | 7/2003 | Usami et al. | 382/165 |
| 6,591,365 B1 | 7/2003 | Cookson | 713/176 |
| 6,636,615 B1 | 10/2003 | Rhoads et al. | 382/100 |
| 6,654,479 B1 * | 11/2003 | Liao et al. | 382/100 |
| 6,718,046 B2 | 4/2004 | Reed et al. | 382/100 |
| 6,721,440 B2 | 4/2004 | Reed et al. | 382/100 |
| 6,728,390 B2 * | 4/2004 | Rhoads et al. | 382/100 |
| 6,744,906 B2 | 6/2004 | Rhoads et al. | 382/100 |
| 6,763,123 B2 | 7/2004 | Reed et al. | 382/100 |
| 6,763,124 B2 | 7/2004 | Alattar et al. | 382/100 |
| 6,771,797 B2 | 8/2004 | Ahmed | 382/100 |
| 6,804,376 B2 | 10/2004 | Rhoads et al. | 382/100 |
| 6,804,377 B2 | 10/2004 | Reed et al. | 382/100 |
| 6,823,075 B2 | 11/2004 | Perry | 382/100 |
| 6,850,626 B2 | 2/2005 | Rhoads et al. | 382/100 |
| 6,891,959 B2 | 5/2005 | Reed et al. | 382/100 |
| 6,912,295 B2 | 6/2005 | Reed et al. | 382/100 |
| 6,915,002 B2 | 7/2005 | Gustafson | 382/100 |
| 6,970,573 B2 | 11/2005 | Carr et al. | 382/100 |
| 6,996,252 B2 | 2/2006 | Reed et al. | 382/100 |
| 7,027,614 B2 | 4/2006 | Reed | 382/100 |
| 7,054,462 B2 | 5/2006 | Rhoads et al. | 382/100 |
| 7,054,463 B2 | 5/2006 | Rhoads et al. | 382/100 |
| 7,171,020 B2 | 1/2007 | Rhoads et al. | 382/100 |
| 7,266,217 B2 | 9/2007 | Rhoads et al. | 382/100 |
| 2001/0008557 A1 | 7/2001 | Stefik et al. | 380/202 |
| 2001/0020270 A1 | 9/2001 | Yeung et al. | 713/176 |
| 2001/0021144 A1 | 9/2001 | Oshima et al. | 369/13 |
| 2001/0024510 A1 | 9/2001 | Iwamura | 382/100 |
| 2001/0026377 A1 | 10/2001 | Ikegami | 358/401 |
| 2001/0028725 A1 | 10/2001 | Nakagawa et al. | 382/100 |
| 2001/0028727 A1 | 10/2001 | Naito et al. | 382/100 |
| 2001/0047478 A1 | 11/2001 | Mase | 713/176 |
| 2001/0051996 A1 | 12/2001 | Cooper et al. | 709/217 |
| 2001/0052076 A1 | 12/2001 | Kadono | 713/176 |
| 2001/0053235 A1 | 12/2001 | Sato | 382/100 |
| 2001/0054144 A1 | 12/2001 | Epstein et al. | 713/161 |
| 2002/0010684 A1 | 1/2002 | Moskowitz | 705/75 |
| 2002/0015509 A1 | 2/2002 | Nakamura et al. | 382/100 |
| 2002/0023148 A1 | 2/2002 | Ritz et al. | 709/219 |
| 2002/0033844 A1 | 3/2002 | Levy et al. | 345/744 |
| 2002/0037091 A1 | 3/2002 | Terasaki | 382/100 |
| 2002/0037093 A1 | 3/2002 | Murphy | 382/112 |
| 2002/0061121 A1 | 5/2002 | Rhoads et al. | 382/100 |
| 2002/0061122 A1 | 5/2002 | Fujihara et al. | 382/100 |
| 2002/0062442 A1 | 5/2002 | Kurahashi | 713/176 |
| 2002/0064298 A1 | 5/2002 | Rhoads et al. | 382/100 |
| 2002/0064759 A1 | 5/2002 | Durbin et al. | 433/213 |
| 2002/0067914 A1 | 6/2002 | Schumann et al. | 386/98 |
| 2002/0068987 A1 | 6/2002 | Hars | 700/94 |
| 2002/0071556 A1 | 6/2002 | Moskowitz et al. | 380/210 |
| 2002/0073317 A1 | 6/2002 | Hars | 713/176 |
| 2002/0080396 A1 | 6/2002 | Silverbrook et al. | 358/1.15 |
| 2002/0095577 A1 | 7/2002 | Nakamura et al. | 713/176 |
| 2002/0097873 A1 | 7/2002 | Petrovic | 380/238 |
| 2002/0097891 A1 | 7/2002 | Hinishi | 382/100 |
| 2002/0105679 A1 | 8/2002 | Haynes | 358/3.28 |
| 2002/0106192 A1 | 8/2002 | Sako | 386/94 |
| 2002/0112171 A1 | 8/2002 | Ginter et al. | 713/185 |
| 2002/0114458 A1 | 8/2002 | Belenko et al. | 380/201 |
| 2002/0122568 A1 | 9/2002 | Zhao | 382/100 |
| 2002/0159615 A1 | 10/2002 | Rhoads et al. | 382/100 |
| 2002/0176114 A1 | 11/2002 | Zeller et al. | 358/3.28 |
| 2003/0009669 A1 | 1/2003 | White et al. | 713/176 |
| 2003/0128860 A1 | 7/2003 | Braudaway et al. | 382/100 |
| 2004/0059581 A1 * | 3/2004 | Kirovski et al. | 704/273 |
| 2004/0181671 A1 | 9/2004 | Brundage et al. | 713/176 |
| 2005/0058320 A1 | 3/2005 | Rhoads et al. | 382/100 |

| | | | | |
|---|---|---|---|---|
| 2005/0160271 | A9 | 7/2005 | Brundage et al. | 713/176 |

FOREIGN PATENT DOCUMENTS

| | | |
|---|---|---|
| EP | 0 629 972 A2 | 12/1994 |
| EP | 0 975 147 A2 | 1/2000 |
| EP | 1041815 A2 | 10/2000 |
| EP | 1077570 A2 | 2/2001 |
| EP | 1202250 A1 | 5/2002 |
| GB | 2346110 A | 8/2000 |
| JP | 3-185585 A | 8/1991 |
| WO | WO95/13597 A2 | 5/1995 |
| WO | WO9820411 A1 | 5/1998 |

OTHER PUBLICATIONS

Lu et al., "Cocktail Watermarking on Images," Proc. 3rd Int. Workshop on Information Hiding, LNCS vol. 1768, Sep./Oct. 1999, pp. 333-347.*

Chow et al., "Forgery and Tamper-Proof Identification Document," IEEE Proc. 1993 Int. Carnahan Conf. on Security Technology, Oct. 13-15, 1993, pp. 11-14.

Philips Electronics, Response to Call for Proposals Issued by the Data Hiding Sub Group Copy Protection Technical Working Group, 1997.

Microsoft Response to CfP for Technology Solutions to Screen Digital Audio Content for LCM Acceptance, SDMI, PDWG Tokyo, May 23, 1999, 9 pages.

Levy, "AIPL's Proposal for SDMI: An Underlying Security System" (slide presentation), Mar. 29, 1999, 23 slides.

Audio Watermarking System to Screen Digital Audio Content for LCM Acceptance, A Proposal Submitted in Response to PDWG99050504-Transition CfP by Aris Technologies, Inc., May 23, 1999, Document Version 1.0, 15 pages.

Audio Watermarking Architectures for Secure Digital Music Distribution, A Proposal to the SDMI Portable Devices Working Group by Aris Technologies, Inc, Mar. 26, 1999, pp. 1-11.

U.S. Appl. No. 60/116,641, filed Jan. 21, 1999 to Christopher Cookson.

Winograd, J.M., Audio Watermarking Architecture for Secure Digital Music Distribution, a Proposal to the SDMI Portable Devices Working Group, by Aris Tech. Inc., Mar. 26, 1999.

Cookson, Chris, General Principles of Music Uses on Portable Devices, presentation to SDMI, Mar. 5, 1999.

Seybold Report on Desktop Publishing, "Holographic Signatures for Digital Images," Aug. 1995, 1 page.

Schneider, M., "A Robust Content Based Digital Signature for Image Authentication," IEEE Proc. Int. Conf. on Image Processing, Sep. 1996, pp. 227-230 (vol. 3).

F. Mintzer and G. Braudaway, "If one watermark is good, are more better?" Proceedings of the International Conference on Acoutics, Speech, and Signal Processing, vol. 4, Phoenix, Arizona, May 1999.

Lin, C.-Y- et al., "Issues and Solutions for Authenticating MPEG Video," Proc. SPIE vol. 3657: Security and Watermarking of Multimedia Contents, Jan. 1999, pp. 54-65.

Kundur et al., "A Robust Digital Image Watermarking Method Using Wavelet-Based Fusion," IEEE Jul. 1997, pp. 544-547.

Larny, P. et al., "Content-Based Watermarking for Image Authentication," Proc. 3.sup.rd Int. Workshop on Information Hiding, Sep./Oct. 1999, pp. 187-198.

Lin, C.-Y. et al., "Generating Robust Digital Signature for Image/Video Authentication," Proc. Multimedia and Security Workshop at ACM Multimedia'98, Sep. 1998, pp. 49-54.

EMI "Screening Content from Compact Discs: ID Trac," SDMII Jun. 3, 1999, 13 pages.

Kawaguchi et al., "Principle and Applications of BPCS-Steganography," Proc. SPIE vol. 3528: Multimedia Systems and Applications, Nov. 2-4, 1998, pp. 464-473.

Komatsu et al., "Authentication System Using Concealed Image in Telematics," Memoirs of the School of Science & Engineering, Waseda Univ., No. 52, 1988, pp. 45-60.

Audio Watermarking Architectures for Persistent Protection, Presentation to SDMI PDWG, Mar. 29, 1999, J. Winograd, Aris Technologies, pp. 1-16.

Komatsu et al., "A Proposal on Digital Watermarking in Document Image Communication and Its Application to Realizing a Signature," Electronics and Communications in Japan, Part I, vol. 73, No. 5, 1990, pp. 22-23.

* cited by examiner

FIG. 3A  GEOMETRICALLY LINEAR ASSIGNMENT
OF PIXELS TO EACH BIT
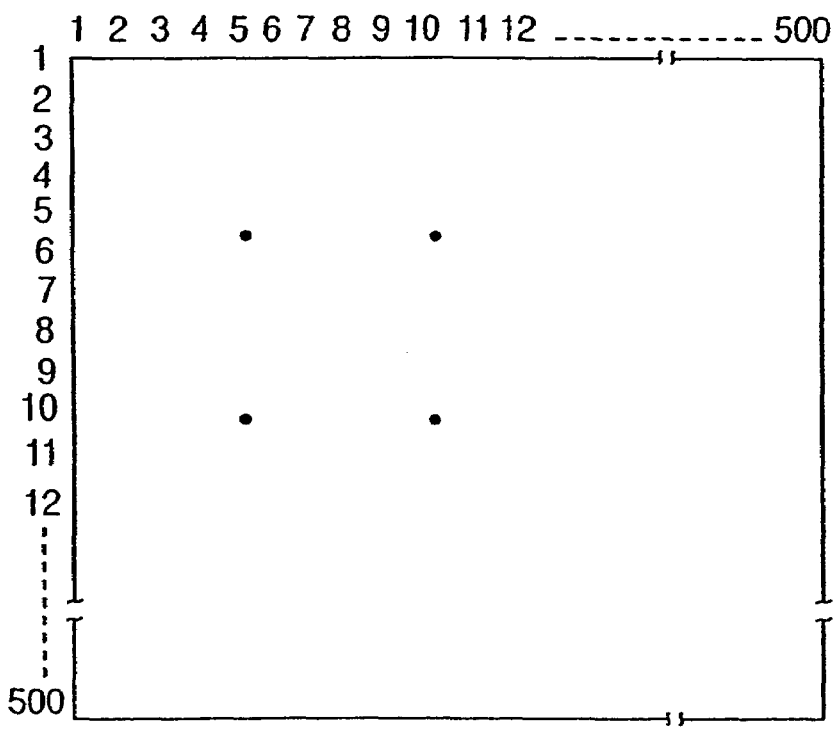
FIG. 3B  GEOMETRICALLY RANDOM ASSIGNMENT
OF PIXELS TO EACH BIT
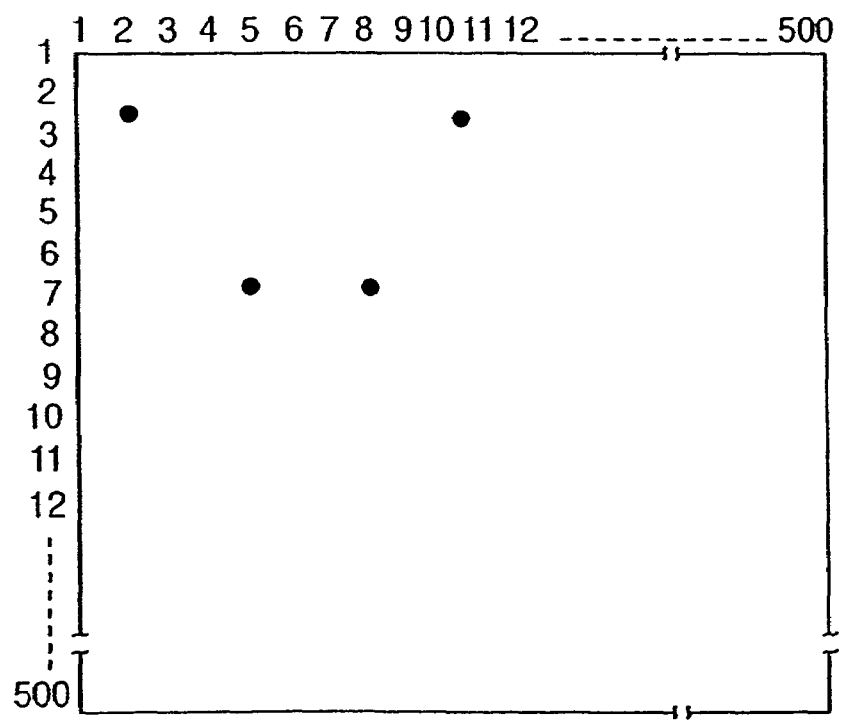

METHODS TO EVALUATE IMAGES, VIDEO AND DOCUMENTS

RELATED APPLICATIONS

This application is a continuation of U.S. patent application Ser. No. 10/723,731, filed Nov. 26, 2003 (now U.S. Pat. No. 7,171,020), which is a continuation of application Ser. No. 10/012,703, filed Dec. 7, 2001 (now U.S. Pat. No. 6,744,906), which is a continuation of application Ser. No. 09/433,104, filed Nov. 3, 1999 (now U.S. Pat. No. 6,636,615), which is a continuation in part of application Ser. No. 09/234,780, filed Jan. 20, 1999 (now abandoned), which claims the benefit of application Ser. No. 60/071,983 filed Jan. 20, 1998.

FIELD OF THE INVENTION

The present invention relates to steganography, and more particularly relates to the use of multiple watermarks to determine the authenticity or history of a particular document or electronic object (e.g., image, motion picture, audio track).

BACKGROUND OF THE INVENTION

Steganographic and digital watermarking technologies are well known. For example see U.S. Pat. No. 5,636,292 and the extensive references cited therein. Also see co-pending patent applications Ser. No. 08/327,426 which was filed Oct. 21, 1994 and co-pending application Ser. No. 08/436,134 which was filed May 8, 1995 (now U.S. Pat. No. 5,748,763).

The technology for inserting digital watermarks in images and the technology for reading or detecting digital watermarks in images is well developed, well known and described in detail in public literature. Furthermore, there are commercially available products which include programs or mechanisms for inserting digital watermarks into images. For example the commercially available and widely used products "Adobe Photoshop" which is marketed by Adobe Corporation of San Jose, Calif. and "Corel Draw" program which is marked by Corel Corporation of Ontario Canada, include a facility for inserting digital watermarks into images.

The technology for making high quality copies of documents is widely available. The technical quality of scanners and color printers has been increasing rapidly. Today for a relatively low cost one can purchase a high quality scanner and a high quality color printer. Thus, it is becoming increasingly easy to duplicate documents. The ability to create high quality copies has created a need for technology which can differentiate between original documents and copies of the original.

It is known that watermarks can be used to help differentiate genuine documents from copies. However, the prior art techniques for using digital watermarks to differentiate genuine documents from copies have serious limitations. The present invention is directed to an improved technique for using steganography and digital watermark technology to facilitate differentiating original documents from copies of the original.

The present invention can also be used for various other purposes such as to embed multiple types of information in a single document or to provide watermarks that enable documents to perform special functions.

SUMMARY OF THE INVENTION

With the present invention multiple digital watermarks, each of which has a different character, are embedded in a document. The characters of the two watermarks are chosen so that the watermarks will be affected in different manners by what may subsequently happen to the document.

The detection process or mechanism reads the two digital watermarks and compares their characteristics. While wear and handling may change the characteristics of the individual watermarks, the relationship between the characteristic of the two watermarks will never-the-less give an indication as to whether a document is an original or a copy of an original.

For example according to the present invention two digital watermarks in a document may have different energy levels. The absolute energy level of a digital watermark in an original image may be decreased if a document is subject to wear. Likewise the energy level of the digital watermark in an image may be decreased if an image is scanned and reprinted on a color printer. However, the relationship between the energy level of the two digital watermarks will be different in an image that has been subject to wear and in a reproduced image. Likewise if two digital watermarks are introduced into an image where the bit pattern used to construct the digital watermarks have different patterns, the ratio between the signal to noise ratio of the watermarks will be different in an original subject to wear and in a copy generated by scanning the original and printing the scanned image. Other characteristics of multiple digital watermarks can also be used to differentiate original documents from copies.

In other embodiments, a watermark-independent assessment of wear can be performed, and the results used to aid in differentiating original documents from copies.

BRIEF DESCRIPTION OF THE FIGURES

FIGS. 3A and 3B show a geometrically linear and a geometrically random assignment of pixels to a bit in a digital watermark.

DETAILED DESCRIPTION

Figure 1:
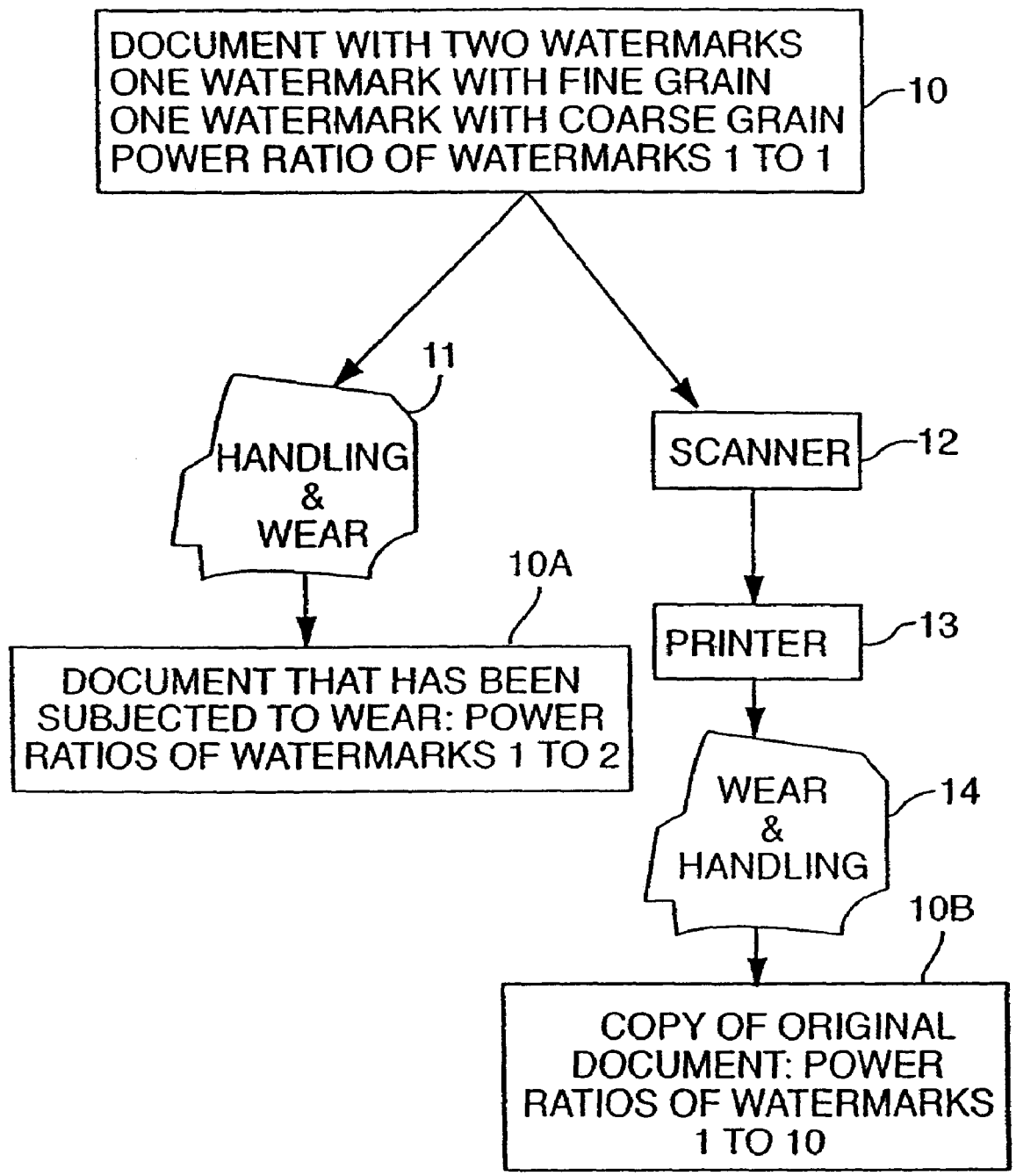
FIG. 1 shows the paths that a document and a copy may follow.

The problem of differentiating an original document from a copy is made more difficult in situations where the original document is subject to being handled, worn, folded and otherwise damaged. Many original documents such as identification documents and currency are extensively handled. The wear to which such documents is subjected reduces the quality of images on the document and therefore reduces the quality of any information embedded in the document using conventional steganographic techniques.

With the present invention, a number of different watermarks are embedded in a document. Each of the watermarks embedded in the document has a different character. All watermarks are somewhat affected when a document is subjected to wear, and all watermarks are somewhat affected when a document is duplicated by being scanned and reprinted. However, the magnitude of the effect caused by being scanned and reprinted on watermarks with certain characteristics is much greater than the effect on watermarks with different characteristics. Likewise, wear and handling of a document affects watermarks with certain characteristics much more than it affects watermarks with different characteristics.

Thus, if multiple watermarks with different characteristics are inserted into a document, it is possible to differentiate a copy from an original document that has been subjected to wear by examining the ratios of characteristics of the watermarks in the image being examined.

In order to print a document on a color printer, the document is put through a transformation from a color space such as the RGB color space to a different color space such as the CMYK (cyan, magenta, yellow, black) color space. Such transformations are well known. For example see chapter 3 entitled "Color Spaces" in a book entitled "Video Demystified, A handbook for the Digital Engineer," Second Edition, by Keith Jack, published by Harris Semiconductor/Hightext Publications of San Diego, Calif., and "The Color PC" by Marc Miller and published by the Hayden Press.

When an image is transformed from one color space to another color space, noise is introduced into the image. Among the reasons for this is the fact that each color space has its own distinctive gamut (or range) of colors. Where the gamut of two color spaces overlap, the conversion from one color space to another color space can in theory be precise. However, there will be some areas that are in the gamut of one color space but not in the gamut of another color space. Such situations definitely introduce noise into the conversion process. Even in areas that are in the gamut of two color spaces, conversion from one color space to another color space introduces noise because of such things as round off errors. The present invention takes advantage of the fact that if an original is copied and then a copy is printed, the image on the printed copy will have gone through several conversions to which the original will not have been subjected. For example, the conversions to which a copy may be subjected are:

1) a document to RGB conversion (i.e. scanning the document into the computer), 2) a RGB to CMYK conversion, 3) a CMYK to copy conversion (i.e. printing the document).

Any characteristics of the two digital watermarks that will be affected differently by the additional conversion process to which copies are subjected can be used to differentiate copies from an original. Since the two watermarks with different characteristics are affected in a different manner by the additional conversion step, a comparison of the characteristics of the two watermarks in a document being examined will indicate if the document is an original (which has not gone through the additional conversions) or a copy which has gone through the additional conversions. While the characteristics of each watermark will have been changed by wear and by the copying process, the comparison between the characteristics of the two watermarks will still be able to differential a copy from an original.

Four embodiments of the invention are described below. Each of the embodiments utilizes two watermarks in a document. The differences between the two watermarks in the document are as follows:

In the first embodiment:
First watermark: Has fine grain
Second watermark: Has a course grain In the second embodiment:
First watermark: Has geometrically linear assignment of pixels
Second watermark: Has geometrically random assignment of pixels.

In the third embodiment:
First watermark: Has low power
Second watermark: Has higher power In the fourth embodiment:
First watermark: uses standard RGB to HSI and HSI to RGB transformations
Second watermark is biased before being transformed from HSI to RGB.

FIG. 1 shows the steps to which documents and copies are typically subjected. In the normal course, a document 10 may be subjected to handling and wear 11 resulting in a worn document 10A. Document 10 may also be scanned as illustrated by box 12. The scanning produces a digital image that can be printed, as illustrated by box 13. The printed image may be subjected to handling and wear 14 resulting in a copy 10B. It is noted that the document 10 may also be subject to handling and wear prior to the scanning operation 12. The task to which this invention is directed is the task of differentiating the worn document 10A from the copy 10B.

Figure 2A:
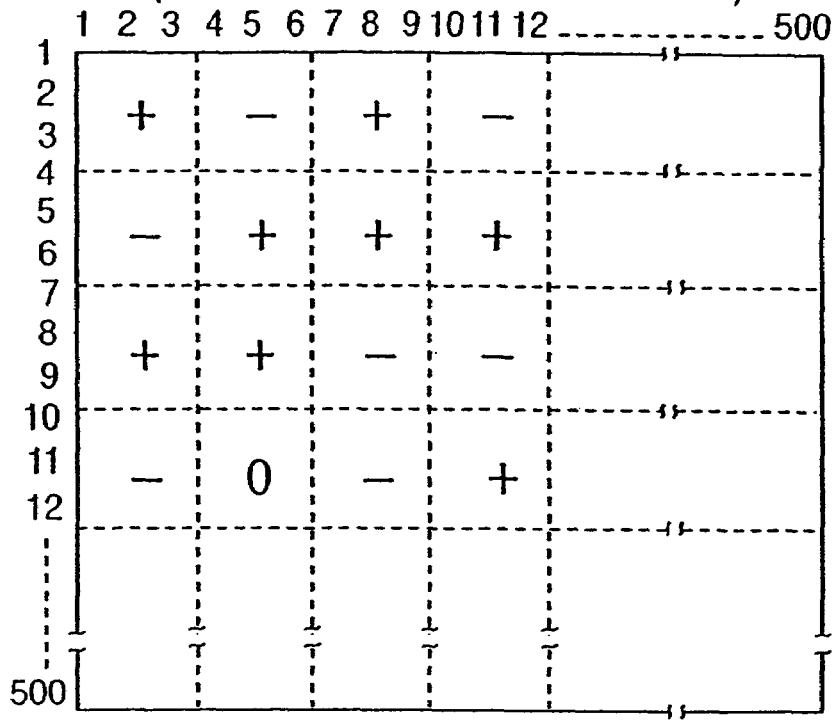
FIGS. 2A and 2B show a fine grain and a course grain watermark.
Figure 2B:
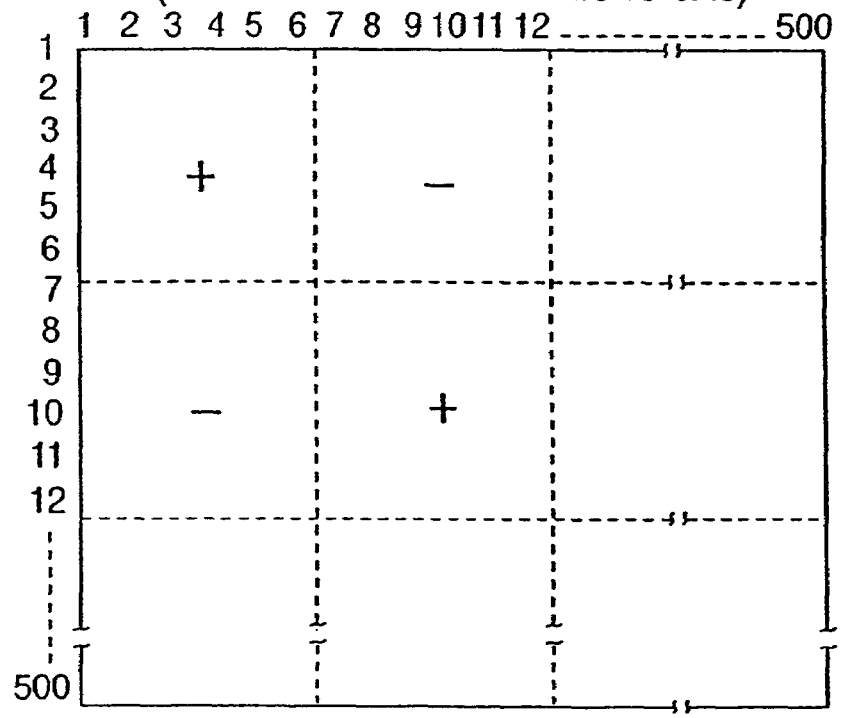

The document 10 includes an image (not explicitly shown) that has two digital watermarks inserted therein. In the first embodiment of the invention, the first watermark has a fine grain and the second watermark has a course grain. The grain of the two watermarks is illustrated in FIG. 2. FIG. 2A shows the grain of the first watermark and FIG. 2B shows the grain of the second watermark. The first watermark uses blocks of 9 pixels (a 3 by 3 block). Each of the pixels in each 9 pixel block has its gray value changed by the same amount. For example FIG. 2A shows that the first 9 pixel block has its gray value increase and the second 9 pixel block has its gray value decreased. The amount of increase and the selection of blocks that is increased and decreased is conventional.

As shown in FIG. 2B, the grain of the second watermark is in blocks that are 6 pixels by 6 pixels or 36 pixels. All of the pixels in each 36 pixel block are changed by the same amount.

In the original document 10, the two watermarks have power ratios of 1 to 1. After wear and handling, the power of the first watermark will be degraded somewhat more than the power of the second watermark. For example, as illustrated in FIG. 1, after document 10 is subjected to handling and wear, a detector which reads the watermarks might find that the power ratio of the water marks is 1 to 2.

If the document 10 is scanned and the resulting digital image is printed to make a copy of the document 10, the ratio of the power of the watermarks will be affected much more than the effect of handling and wear. For example as illustrated in FIG. 1, the power ratio of the watermarks may be 1 to 10, thereby allowing one to differentiate the worn original document 10A from the copy 10B.

It is noted that the mechanism for inserting watermarks into an image is well known, as is the technique for reading a watermark and using correlation techniques to determine the signal to noise ratio (i.e. the power) of a watermark.

FIGS. 3A and 3B show an alternative technique for implementing the present invention. In the second embodiment of the invention, the two watermarks inserted into the image on a document have different patterns of assigning pixels to the bits of the payload represented by the watermark. The first watermark utilizes a geometrically linear assignment of pixels to each bit. For example FIG. 3A shows an image that has 500 by 500 pixels. Considering a watermark payload with 50 bits, each bit of the watermark would have 5000 pixels assigned to represent that bit. A linear assignment could have each fifth bit in each row (100 bits per row) and each fifth row (50 rows) assigned to each bit of the watermark. Thus 5000 pixels would be assigned to each bit in a very orderly or linear manner.

In the second watermark the pixels would be assigned to each bit in a random manner as shown in FIG. 3B. Each bit in the watermark would still have 5000 assigned bits; however, the pixels would be a random location over the image. Naturally it should be understood that FIG. 3A and 3B illustrate how pixels are assigned to one bit of the watermark. The other bits of the watermarks would have pixels assigned in a similar manner.

Similar to the first embodiment of the invention, the watermark with a linear assignment of pixels and the watermark with a random assignment of pixels would be affected differently by handling and wear on the original document than they would be by being scanned and reprinted.

The third embodiment of the invention described herein utilizes watermarks that have different power levels. Handling and wear as contrasted to scanning and printing would affect a watermark with a low power level differently than a watermark with a high power level. Watermarks with different power levels can be inserted into a document in order to practice the present invention utilizing commercially available programs such as Adobe Photoshop or Corel Draw. In the Adobe Photoshop and Corel Draw programs, the power or intensity of the watermark can be adjusted by setting a simple control setting in the program.

Figure 4:
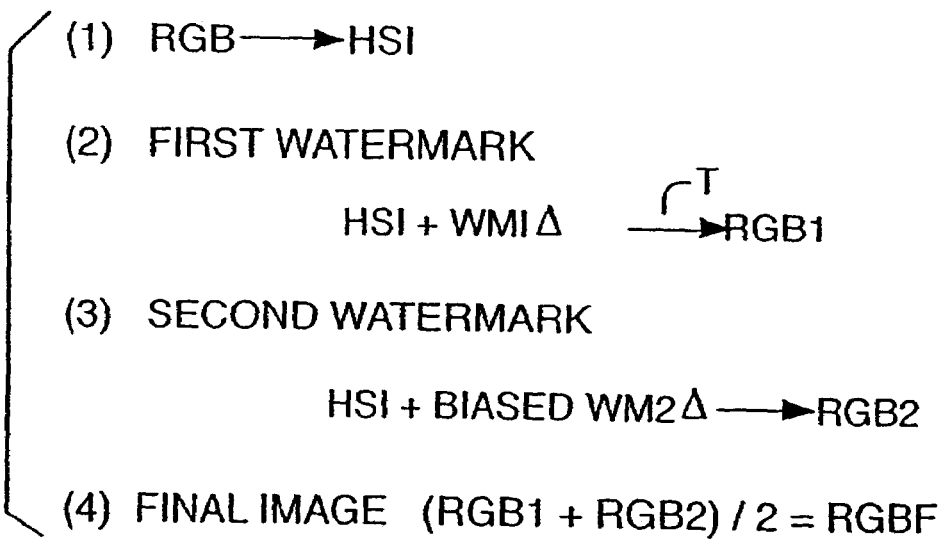
FIG. 4 illustrates a fourth embodiment of the invention.

The fourth embodiment of the invention introduces different characteristics into two watermarks by modifications made to one of the watermarks during the initial step during which the watermarks are introduced into an image. The operation of the fourth embodiment can be explained as shown in FIG. 4. First as illustrated by equation 1 there is a conversion from RGB to HSI as is conventional. This is illustrated by equation 1. As illustrated by equation 2, the first watermark is inserted into the image in a conventional manner by modifying the I value in the HSI representation of the image using the first watermark values (designated as WM1 Δ). A first RGB value designated RGB(1) is then calculated using a conventional transformation designated T. As indicated by equation 3, the second watermark WM2 is then biased toward a particular color and the biased watermark is then combined with the HSI values and transformed to a second set of RGB values designated RGB(2). Finally as indicated by equation 4, the values RGB(1) and RGB(2) are combined to form the watermarked image designated RGB (F).

The transform used to go from RGB to HSI color space (indicated in equation 1 in FIG. 4) can be anyone of a variety of known other techniques. For example, the RGB to HSI conversion can be one of the techniques explained in the above referenced text book such as the following: (which assumes that RGB and Intensity have a value range of 0 to I and that Red equals 0°):

First calculate:

$M=\max(R,G,B)$ $m=\min(R,G,B)$ $r=(M-R)/(M-m)$ $g=(M-G)/(M-n)$ $b=(M-B)/(M-m)$

Then calculate I, S, and H as follows:
a) $I=(M+M)/2$
b) if $M=m$ then $S=0$ and $H=180$
if $I<$ or $=0.5$ then $S=(M-m)/(M+m)$
if $Ib >0.5$ then $S=(M-m)/(2-M-m)$
c) if $R=M$ then $H=60(b-g)$
if $G=M$ then $H=60(2+r-b)$
if $B=M$ then $H=60(4+g-r)$
if $H>$ or $=360$ then $H=H-360$
if $H<0$ then $H=H+360$ The first watermark in inserted into the RGB values in a conventional manner by modifying the I value of appropriate pixels so as to combine the watermark Δ values with HSI values. This is indicated by equation 2 in FIG. 4. Next as indicated by equation 3 in FIG. 4, the HSI values are converted to RGB values using a transform "T". The transform "T" can be conventional and it can for example be done as follows:

First calculate:

if $I<$ or $=0.5$ then $M=I(I+S)$ if $I>0.5$ then $M=I+S-IS$ $m=2I-M$ if $S=0$ then $R=G=B=I$ and $H=180°$ Then calculate R, G and B as follows:
a) if $H<60$ then $R=M$
if $H<120$ then $R=m+((M-m)/((120-H)/60))$
if $H<240$ then $R=m$
if $H<300$ then $R=m+((M-m)/((H-240/60))$
otherwise $R=M$
b) if $H<60$ then $G=m+((M-m)/(H/60))$
if $H<180$ then $G=M$
if $H<240$ then $G=m+((M-m)/((240-H\_/60))$
otherwise $G=m$
c) if $H<120$ then $B=m$
if $H<180$ then $B=m+((M-m)/((H-120/60))$
if $H<300$ then $B=M$
otherwise $B=m+((M-m)/((360-H)/60))$ Next the values which represent a second watermark are used to calculate a second set of RGB values designated RGB2. In order to calculate RGB2, the values of H and S are modified so that they are slightly biased toward a particular color designated H1 and S1 New values for H and S are calculated as follows:

(Note, H1 must be between 0 and 360, S1 must be non-negative and can be between 0 and 1 and X is a value between 0 and 1)

Calculate new values for H and S as follows:

If $H>H1$ then $H=H-(H-H1)x$ else $H=H+(H1-H)x$

If $S>S1$ then $S=S-(S-S1)x$ else $S=S+(S1-S)x$

Next add the second watermark to the values of HSI and transform these values to the RGB color space as indicated by equation 3 The transformation from HSI color space to RGB color space is done as previously indicated.

Finally as indicated by equation 4 in FIG. 4, the final RGB value (designated RGBF) is calculated by combining the values of RGB I and RGB2. This combination can be done in a variety of known ways.

It is noted that in the above example the difference between the transformation used for the first and the second watermarks involves biasing the values of H and S. Alternatively a wide variety of different changes could also be made. The key to this fourth embodiment of the invention is that in effect a different transformation is used for the first and the second watermarks.

In more sophisticated embodiments, the wear of the document can be independently assessed and used to aid in distinguishing an original from a copy.

Figure 5A:
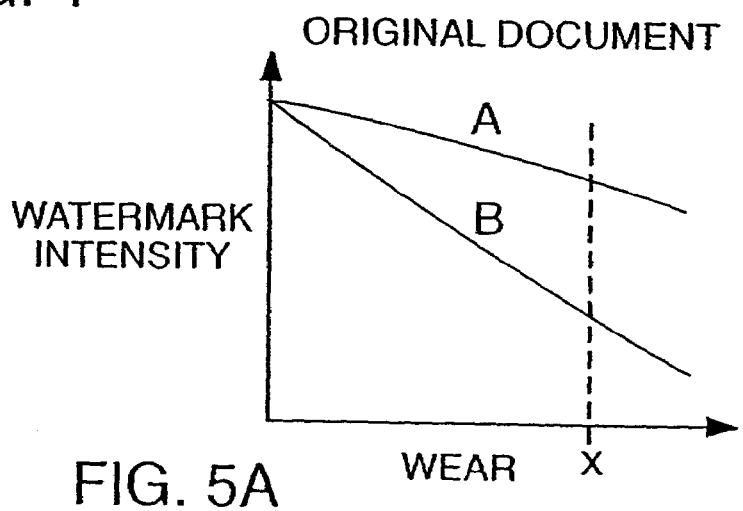
FIGS. 5A and 5B illustrate watermark strength v. wear charts.
Figure 5B:
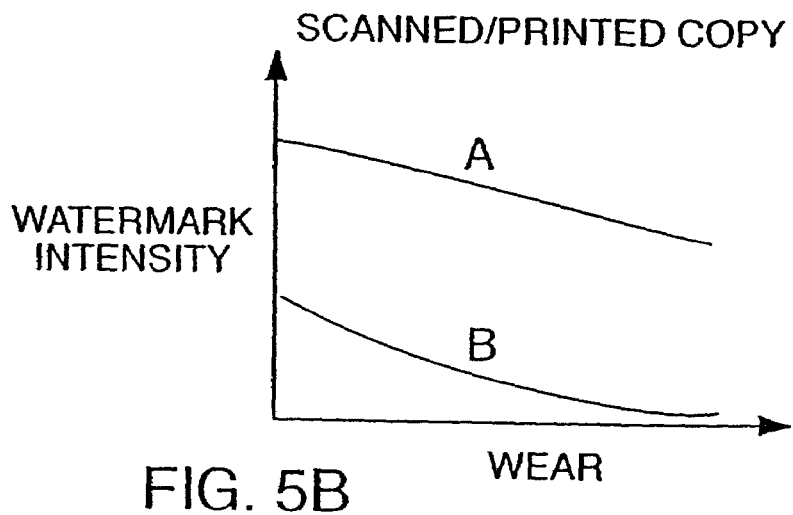

There may be cases in which the wear-based degradation to the watermarks in a worn but original document can yield results similar to the scan/print degradation to the watermarks in a crisp copy. For example, consider the case of an original document having watermarks A and B of equal energy, but tailored so that watermark B is more frail and falls-off rapidly in energy when photocopied. On finding a suspect document with a ratio of energy between the two documents in excess of 2:1 (or a commensurate difference in signal-to-noise ratios), a counterfeit may be presumed. However, this ratio may also result from extreme wear of an original document. See, e.g., the watermark strength v. wear chart of FIGS. 5A and 5B for an original document, and the same document after scanning on a 600 dpi scanner and printing on a 720 dpi printer. The original document degrades to a watermark energy ratio of 2:1 at point x. A crisp copy has the same ratio, resulting in a potential ambiguity.

To distinguish these two cases, the wear of the document can be assessed. Various means can be used to distinguish document wear. One is high frequency content, as can be determined by high pass filtering the document image data, or performing an FFT, DCT, etc. A worn document typically loses some high frequency energy. Another is contrast—a worn document typically loses contrast. Still another is color gamut—a worn document may fade to a less varied gamut. Still another is luminance—the soiling of a document can decrease the overall document brightness. Yet another is physical integrity—a worn document droops when only partially supported. Yet another means is a quick human assessment of wear, with human entry of a corresponding datum into a system (e.g., on a wear scale of 0 to 10, or simply "crisp," "used," or "very worn"). Still other means can similarly be employed.

The wear can be graded on an arbitrary scale, depending on the particular measurement means used. In an illustrative case, wear may range from 0 ("crisp") to 7 (extreme). In the FIG. 5 example, the x point may be at wear value 5. In distinguishing the documents, a look-up table, microprocessor-implemented algorithm, or other arrangement can be provided that takes as its input the ratio and wear values, and produces outputs, e.g., as follows:

(The "Error?" outputs corresponds to cases that should not occur in actual practice, e.g., a very worn document in which the ratio of watermarks is 1.0.)

While four embodiments and a further enhancement of the invention have been shown herein, it should be understood that many other characteristics and attributes of a digital watermark could be used to practice the present invention in addition to the characteristics and attributes described herein. Furthermore other known digital watermarking techniques can be used together with and applied to the digital watermarks used for the present invention. It is also noted that while in the above examples only two watermarks were used; in some situations one could use three, four five or more watermarks. That is, the embodiments of the invention specifically described herein utilize two watermarks. It should be understood that any number of watermarks could be utilized in like manner. Furthermore while the embodiments shown herein utilize two separate watermarks, the two watermarks used to practice the present invention could be combined into one watermark which has a plurality of separate identifiable and measurable characteristics.

Still further, while the invention was particularly illustrated with reference to watermarking that is effected in the pixel domain, the same techniques are likewise applicable to watermarking effected in the DCT, wavelet, or other domain (e.g., as shown in U.S. Pat. No. 5,930,369). Moreover, some documents may include watermarks effected in two different domains (e.g., pixel and DCT).

Still further, the different watermarks can be of entirely different types. For example, one watermark can comprise slight alterations to the image normally printed on a document, and the second can comprise a texture formed on the document substrate, or a background weave or tint pattern—both of which convey watermark data. (Examples of texture-, weave- and tint-based watermarks are shown, e.g., in copending applications Ser. No. 09/074,034 (filed May 6, 1998), Ser. No. 09/127,502 (filed Jul. 31, 1998), Ser. No. 09/151,492 (filed Sep. 11, 1998), U.S. Pat. No. 5,850,481, and laid-open PCT publication WO 99/53428.

It is noted that while the present invention utilizes multiple watermarks with different characteristics to differentiate original documents from copies of the original, one can also utilizes multiple watermarks with different characteristics for other reasons. Documents may include multiple similar

|  | Wear = 0 | Wear = 1 | Wear = 2 | Wear = 3 | Wear = 4 | Wear = 5 | Wear = 6 | Wear = 7 |
| --- | --- | --- | --- | --- | --- | --- | --- | --- |
| Ratio = 1.0 | Original | Original | Original | Original | Error? | Error? | Error? | Error? |
| Ratio = 1.25 | Original | Original | Original | Original | Original | Error? | Error? | Error? |
| Ratio = 1.5 | Original | Original | Original | Original | Original | Original | Error? | Error? |
| Ratio = 1.75 | Copy | Copy | Original | Original | Original | Original | Original | Error? |
| Ratio = 2.0 | Copy | Copy | Copy | Copy | Original | Original | Original | Original |
| Ratio = 2.25 | Copy | Copy | Copy | Copy | Copy | Original | Original | Original |
| Ratio = 2.5 | Copy | Copy | Copy | Copy | Copy | Copy | Original | Original |
| Ratio = 2.75 | Copy | Copy | Copy | Copy | Copy | Copy | Original | Original |
| Ratio = 3.0 | Copy | Copy | Copy | Copy | Copy | Copy | Copy | Original |
| Ratio => 3.25 | Copy | Copy | Copy | Copy | Copy | Copy | Copy | Copy | watermarks in addition to the watermarks having different characteristics according to the present invention. As used herein, the term "document" generally refers to a physical entity. However, the same methodologies can also be applied to purely digital images—e.g., to detect losses that an image has suffered through a lossy compression/decompression process such as JPEG or MPEG, color re-balancing, etc., and thereby discern something about the history of a digital image.

It will be recognized that the principles of the invention can be incorporated into an apparatus used at cash registers and other points of sale to assess the genuineness of banknotes, food stamps, coupons, and other documents. Such an apparatus can include a scanning 1D, or stationary 2D image sensor (e.g., CMOS or CCD), and a microprocessor suitably programmed to discern first and second watermarks in image data provided by the sensor (as well as wear, if desired). (In some cases, a stationary ID sensor may be employed.) Such apparatus further includes an output device—such as a display screen, indicator light, audible tone, voice synthesizer, or equivalent device—to provide an appraisal of the document's validity based on the sensed information.

A similar apparatus can be provided for use by Customs officials at ports of entry to check merchandise tags, packaging, labels, and other printed indicia associated with clothing, purses, electronic components, software, and other readily-counterfeitable goods, to determine whether the sensed tag/package/label is an original, or a copy. While such a determination may not provide the confidence needed to seize a shipment as counterfeit, it could flag the goods as suspect and needing further inspection and/or forensic analysis.

The idea in each of the foregoing apparatuses is, of course, to provide an indication of possible non-genuineness more reliable than the typical casual and semi-casual human inspection during very fast point-of-sale transactions and other similar high traffic volume situations, where it is unrealistic to expect human observation to be efficient "flaggers" of suspect product and documents.

To provide a comprehensive disclosure without unduly lengthening this specification, applicants incorporate by reference the documents (including applications) cited above.

While the present invention has been described with respect to four specific embodiments of the invention, it should be understood that various changes in form a and detail could be made without departing from the spirit and scope of the invention. The scope of the present invention is limited only by the appended claims.

What is claimed is:

1. A method comprising:
    obtaining an image or video;
    encoding a first steganographic component in the image or video, wherein the first steganographic component comprises a first set of properties that are designed to be affected in a first manner when transformed from a first domain to a second domain; and
    encoding a second steganographic component in the image or video, wherein the first steganographic component comprises a second set of properties that are designed to be affected in a second manner when transformed from the first domain to the second domain.

2. The method of claim 1 wherein the first set of properties comprises a signal to noise ratio.

3. The method of claim 1 wherein the second set of properties comprises a signal to noise ratio.

4. The method of claim 1 wherein the second set of properties comprises a signal bias.

5. The method of claim 1 wherein the first set of properties or the second set of properties comprises a power level.

6. The method of claim 1 wherein the first set of properties or the second set of properties comprise at least one property associated with pixels.

7. The method of claim 6 wherein the one property comprises pixel alignment.

8. The method of claim 6 wherein the second set of properties comprises a random assignment of pixels.

9. The method of claim 1 wherein the first set of properties or the second set of properties comprise at least one property associated with grain.

10. The method of claim 1 wherein the first domain or the second domain comprises a transform frequency domain.

11. The method of claim 1 wherein the first domain comprises a first color gamut and the second domain comprises a second color gamut.

12. A method comprising:
    obtaining an image or video;
    hiding a first component in the image or video, wherein the first component is designed to change in a first manner when transformed from a first domain to a second domain; and
    hiding a second component in the image or video, wherein the second component is designed to change in a second manner when transformed from a first domain to a second domain.

13. The method of claim 12 wherein the first domain or the second domain comprises a transform frequency domain.

14. The method of claim 12 wherein the first domain comprises a first color gamut and the second domain comprises a second color gamut.

15. The method of claim 12 wherein said acts of hiding are accomplished with digital watermarking.

16. A method comprising:
    obtaining an image or video, the image or video including a first component and a second component hidden therein, wherein the first component is hidden to change in a first manner when transformed from a first domain to a second domain, and the second component is hidden to change in a second manner when transformed from the first domain to the second domain;
    analyzing properties associated with the first component and the second component;
    determining from at least said act of analyzing whether the image or video has undergone a transformation from the first domain to the second domain.

17. The method of claim 16 wherein the properties comprise a signal to noise ratio.

18. The method of claim 16 wherein the properties comprise a signal bias.

19. The method of claim 16 wherein the properties comprise a power level.

20. The method of claim 16 wherein the properties comprises a random assignment of pixels.

21. The method of claim 16 wherein the first domain or the second domain comprises a transform frequency domain.

22. The method of claim 16 wherein the first domain comprises a first color gamut and the second domain comprises a second color gamut.

* * * * *